May 31, 1927.
J. A. GANSTER
1,630,339
ANTIFRICTION BEARING AND METHOD OF ASSEMBLING THE SAME
Filed July 13, 1925    2 Sheets-Sheet 1
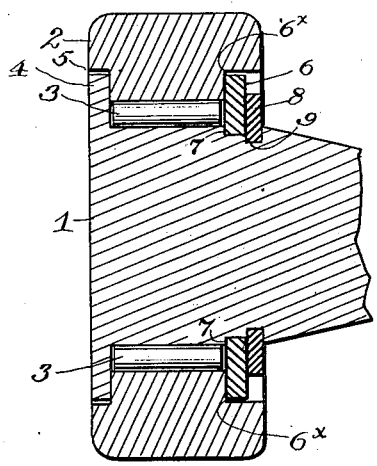
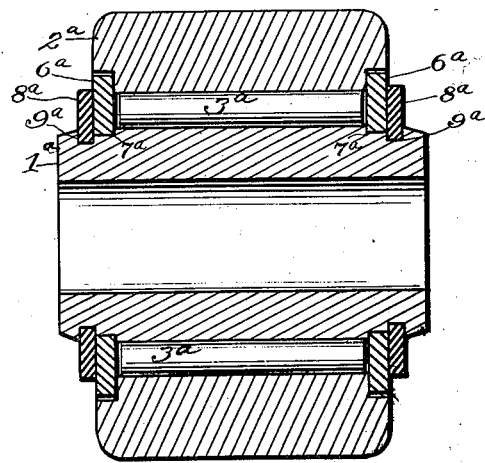
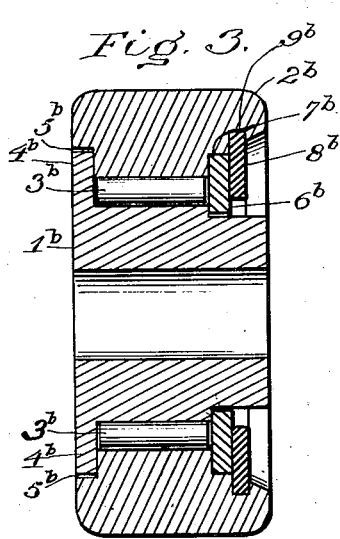
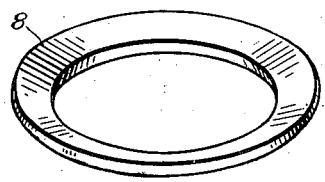
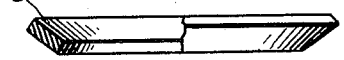
INVENTOR
J. A. Ganster
BY Rogers, Kennedy Campbell
ATTORNEYS May 31, 1927. 1,630,339
J. A. GANSTER
ANTIFRICTION BEARING AND METHOD OF ASSEMBLING THE SAME
Filed July 13, 1925 2 Sheets-Sheet 2
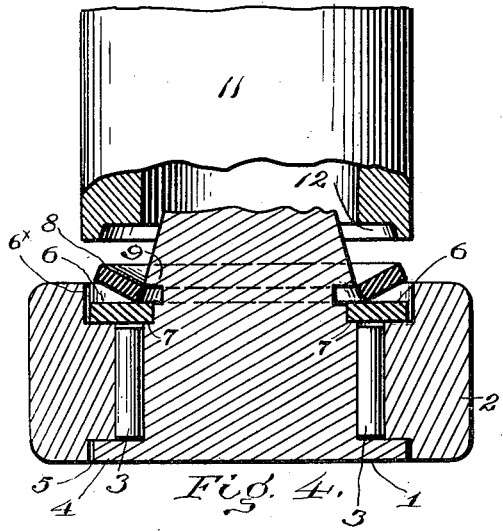
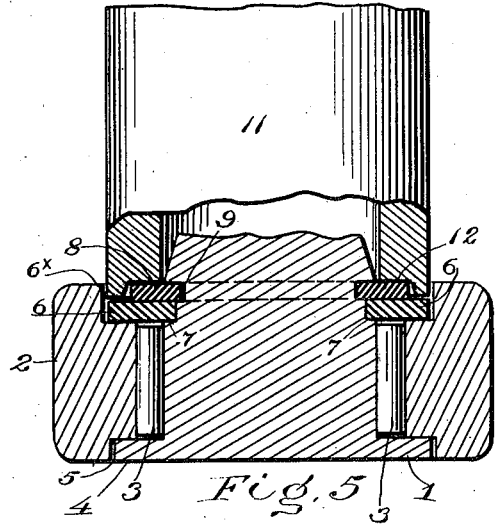
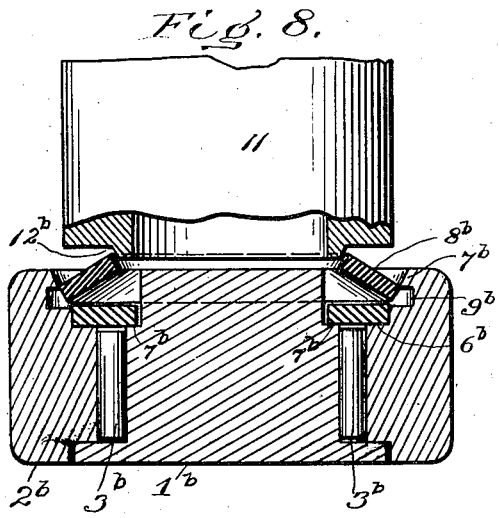
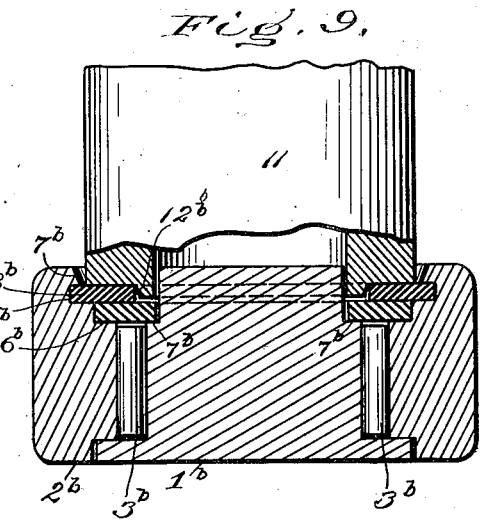
INVENTOR
J. A. Ganster
BY Rogers Kennedy Campbell
ATTORNEYS.

Patented May 31, 1927.

1,630,339

UNITED STATES PATENT OFFICE.

JOSEPH A. GANSTER, OF PHILADELPHIA, PENNSYLVANIA.

ANTIFRICTION BEARING AND METHOD OF ASSEMBLING THE SAME.

Application filed July 13, 1925. Serial No. 43,196.

This invention relates to anti-friction bearings, and the method of assembling the same, the objects of the invention being to produce a bearing which may be manufactured at small cost, will be efficient and durable in operation, and in which the parts may be assembled to contain a full complement of the rolling elements, and permanently confined in their assembled relations so as to produce a self-contained, self-handling structure. With these and other objects in view the invention consists of the improved construction and arrangement of parts, and the improved method of assembling and confining said parts in their proper relations, which improvements will be described in detail in the specification to follow, and the novel features thereof pointed out in the appended claims.

In the accompanying drawings:

Fig. 1 is a longitudinal section through an anti-fraction bearing of one form having my invention embodied therein.

Fig. 2 is a similar view of a bearing of a slightly different form embodying my invention.

Fig. 3 is a longitudinal section through a bearing showing the invention in modified form.

Fig. 4 is a sectional elevation on an enlarged scale of a partially assembled bearing of the form shown in Fig. 1, to illustrate the method of assemblage, and showing the fastening member previous to its deformation.

Fig. 5 is a similar view showing the fastening member deformed and contracted on the inner bearing ring to complete the assemblage.

Fig. 6 is a perspective view of the fastening member before its deformation.

Fig. 7 is a cross section through the same.

Fig. 8 is a view similar to Fig. 4, showing how the method of assemblage is practiced in connection with a bearing of the form of Fig. 3.

Fig. 9 is a view similar to Fig. 8 showing the fastening member deformed and expanded to interlock the outer bearing ring to complete the assemblage.

Referring to the drawings:

Referring particularly to Fig. 1, the anti-friction bearing there illustrated comprises an inner casing member 1, an outer casing member 2, and a series of interposed rolling elements 3, which in the present instance are in the form of cylindrical rollers traveling on the raceways on the casing members and completely filling the annular space between said members so as to constitute a bearing of the so-called full type, i. e. with a full complement of bearing rollers without spacing means, so as to support the maximum load.

In the form of the bearing illustrated, the rollers are confined at one of their ends by a radial flange 4 which is shown as formed integral with the inner casing member and which extends across the annular space between the casing members and seats at its outer edge in an annular cavity 5 formed in the end of the outer casing member, this flange thus serving to receive the end thrusts of the rollers at that end of the bearing. At their opposite ends the rollers are confined and their end thrusts received, by a confining member in the form of a washer 6 which is seated on a peripheral ledge or shoulder 7 formed on the inner casing member, and which washer extends across the annular space between the casing members and seats at its outer edge in an annular cavity or recess 6× in the end of the outer casing member.

The confining washer 6 is, in accordance with my invention, fastened fixedly in position on its supporting casing member, by means of a fastening member in the form of a washer 8 which is seated tightly at its inner edge in a peripheral groove 9 in the inner casing member and bears forcibly and tightly against the outer face of the confining washer, thereby holding the same fixedly and firmly to its seat on the ledge. As will be later explained in describing the method of assemblage of the parts of the bearing, the fastening washer 8 is forced into the groove 9 by a deforming action of the washer, and the thickness of the confining washer is such that when seated on the ledge it will project a short distance in the plane of the groove 9, the result being that the fastening washer in its interlocked fixed connection with the casing member, will engage the confining washer very firmly and tightly, the casing member and the two washers thus forming in effect a unitary practically integral structure, with the parts permanently connected together. A bearing of this form is therefore self-contained and self-handling, and the parts incapable of separation except by cutting them away or destroying them.

The bearing shown in Fig. 2 is of the same construction as that described, except that confining washers and fastening washers are employed at both ends of the bearing, instead of at only one end as in Fig. 1. In Fig. 2 it will be seen that the inner casing member is of ring-like or annular form so that the bearing may be mounted on a shaft or like support, and the casing member is provided at opposite ends with ledges 7ª to receive the confining washers 6ª, and with adjoining grooves 9ª to receive the fastening washers 8ª.

In Fig. 3 the construction is the same as those described, except that in this case the confining washer 6ᵇ and the fastening washer 8ᵇ are applied to the interior of the outer casing member 2ᵇ of the bearing, this casing member being provided with an interior ledge 7ᵇ to receive the confining washer, and being provided adjacent said ledge with a groove 9ᵇ to receive the fastening washer.

In assembling the parts of the bearing and securing them in their assembled relations in accordance with the present invention, the outer casing member is assembled around the inner casing member, and a full complement of the rollers set in place in the annular space between the casing members as shown in Fig. 4. The confining washer 6 is next seated on the annular ledge 7 on the inner casing member, and the fastening washer 8 is then positioned on the confining washer with its inner edge in the plane of the groove 9. This fastening washer is adapted to be deformed in effecting its connection with the casing member, and for this purpose it is made cup-shaped or concave in cross section as in Figs. 4, 6 and 7, and when positioned as shown in Fig. 4 to be interlocked with the inner casing member, the concavity of the ring is presented to the outside, so that when the washer is flattened out by deformation, it will be contracted and its inner edge caused to be forced tightly into the groove 9. This deformation and flattening of the ring is effected in the present instance by means of a plunger 11 of hollow tube-like form which by suitable means is brought down against the washer and pressed firmly against the same so as to flatten it out and cause its inner edge to crowd into the groove 9, and its inner face to bear forcibly and flatly against the outer face of the confining washer as shown in Fig. 5. To bring this action about, the active face of the plunger is formed with a cavity or groove 12 the outer wall of which is adapted, when the plunger is pressed down on the washer, to fit around and confine the outer annular edge of the same, the bottom of said cavity being in a flat plane at right angles to the axis of the plunger. From this form of the plunger in its relation to the cup shaped or concave washer as shown in Fig. 4, it will be understood that when the plunger is forced down on the washer, it will act to flatten out the same, and by reason of the fact that the outer edge of the washer is surrounded and confined by the outer wall of the cavity in the plunger, the outer edge of the washer will be prevented from radial displacement or spread, so that the flattening action will result in the inner edge of the washer being forced into the groove 9, and the washer will be deformed from a dish or conical shape to a flat shape with its upper face conforming to a plane coincident with the plane of the bottom of the plunger cavity.

The method of assemblage above described is shown in Figs. 4 and 5 in connection with a bearing of the form illustrated in Fig. 1, but it is applicable as well to a bearing of the form shown in Fig. 2 in which case, the bearing after the fastening washer at one end is deformed and seated in position, would be reversed and the same operation carried out in seating the fastening washer at the opposite end of the bearing, the deformation of the fastening washers in these cases resulting in a contraction of the washer so as to tightly embrace the inner casing member.

In Figs. 8 and 9 I have shown the method carried out in connection with the assemblage of the parts of the bearing of the form shown in Fig. 3, in which the fastening washer is expanded into interlocking engagement with the outer casing member. In this case the only difference in the operation would be to place the cup-shaped fastening washer in position with its convex side presented to the action of the plunger as shown in Fig. 8, so that when the plunger is operated to flatten out the washer, the latter in its deformation will be expanded and its outer edge crowded and forced into the groove 9ᵇ in the outer casing member, while at the same time its inner face will be caused to forcibly and tightly engage the outer face of the confining washer and fasten the same on its seat as shown in Fig. 9. It will be observed that the plunger 11 in this case is formed with a recess or cavity 12ᵇ, the inner wall of which will, when the plunger is pressed down on the washer, fit within the inner annular edge of the same, and will act, in the flattening action of the washer, to prevent said edge from movement or displacement inwardly, with the result that the outer edge of the washer will be caused to enter and seat firmly in the groove 9ᵇ.

Due to the fact that the confining washer is of a thickness to project into the plane of the groove which receives the fastening washer, the latter, as its edge is crowded into the groove, will engage the confining washer with great force and tightness, with the result that the parts will be jointed together with great firmness and rigidity and will produce in effect a unitary practically integral structure.

In the action of the plunger both in contracting the confining washer in a groove in the inner casing member as shown in Figs. 4 and 5, and in expanding the confining washer in a groove in the outer casing member as shown in Figs. 8 and 9, the washer is confined by the plunger at one of its annular edges in such manner that the opposite edge of the washer will, as the washer is flattened out in a plane at right angles to the axis of the plunger, be positively forced into the groove in the casing member, either the groove in the inner casing member when the outer edge of the washer is confined, or the groove in the outer casing member when the inner edge of the washer is confined. In this way the washer will be seated in a uniform and reliable manner in the groove in the casing member, and will be prevented from expanding or contracting away from said groove and thereby failing to seat therein.

In the foregoing description and accompanying drawings I have set forth my invention, both in respect to the construction of the bearing and the method of assemblage, in the particular detailed form and sequence of steps which I prefer to adopt, and which in practice has been found to answer to a satisfactory degree the ends to be attained. It is manifest however that these details and sequence of steps may be variously modified and changed within the knowledge of the skilled mechanic without departing from the spirit of the invention; and it will be understood that the invention is not limited to any particular details, or sequence of steps, except in so far as such limitations are specified in the claims.

Having thus described my invention, what I claim is:

1. In an anti-friction bearing, the combination of inner and outer casing members and interposed rolling elements, a confining washer for the rolling elements applied to one of said members, and a circumferentially continuous deformed fastening washer fixedly interlocked with said casing member, and forcibly engaging the confining washer to fasten it permanently in place.

2. In an anti-friction bearing, the combination of inner and outer casing members and interposed rolling elements, one of said members being provided with a seat to receive a confining member for the rolling elements and being provided also with a groove adjacent said seat, a confining member applied to said seat and of a thickness to project into the plane of the groove, and a fastening member seated in the groove and forcibly engaging the projecting portion of the confining washer.

3. In an anti-friction bearing, the combination of inner and outer casing members and interposed rolling elements, one of said casing members being formed with a ledge and with a groove adjoining the ledge, a washer for confining the rolling elements, seated on the ledge, said washer being of a thickness to project into the plane of the groove, and a circumferentially continuous deformed fastening washer crowded into the groove and forcibly engaged with the projecting portion of the confining washer and acting to hold the same fixedly in position.

4. The method of assembling anti-friction bearings comprising inner and outer casing members and interposed rolling elements, one of which casing members is provided with a ledge and with an adjoining groove, which method consists in seating on the ledge a washer to confine the rolling elements and of a thickness to project into the plane of the groove, and forcing into the groove by deformation, a fastening washer, while causing the deformed washer to forcibly engage the projecting portion of the confining washer.

5. The method of assembling anti-friction bearings comprising inner and outer casing members and interposed rolling elements, which method consists in applying a washer to one of the casing members to confine the rolling elements, applying to the confining washer a fastening washer concave in cross section, and by deformation flattening out the fastening washer into interlocking engagement with said casing member and into forcible engagement with the confining washer to fasten the same fixedly in place.

6. The method of assembling anti-friction bearings comprising inner and outer casing members and interposed rolling elements, one of which casing members is provided with a ledge and with an adjoining groove, which method consists in seating on the ledge a confining washer to confine the rolling elements, applying to said seated confining washer a fastening washer dish-shaped in cross section with its edge in the plane of the groove in the casing member, and by deformation flattening out the fastening washer to cause its edge to be crowded into the groove, while causing the deformed washer to forcibly engage the confining washer.

7. The method of assembling bearings comprising inner and outer casing members and interposed rolling elements, which method consists in assembling the rolling elements between the inner and outer casing members, assembling in relation to one of said casing members, a fastening washer concave in cross section, and confining one of the annular edges of said fastening washer against radial displacement, while flattening out said washer to cause its other annular edge to interlock with said casing member.

8. The method of assembling anti-friction bearings comprising inner and outer casing members and interposed rolling elements, which method consists in assembling the rolling elements between the casing members, applying a washer to one of the casing members to confine the rolling elements, assembling in relation to the confining washer a fastening washer concave in cross section, and confining one annular edge of said fastening washer against radial displacement, while flattening out said fastening washer to cause its other annular edge to interlock with said casing member.

9. The method of assembling anti-friction bearings comprising inner and outer casing members and interposed rolling elements, which method consists in assembling the rolling elements between the casing members, applying a washer to one of the casing members to confine the rolling elements, assembling in relation to the confining washer a fastening washer concave in cross section, and confining one annular edge of said fastening washer against radial displacement, while flattening out said fastening washer to cause its other annular edge to interlock with said casing member, and the side of the flattened out washer to forcibly engage the side of the confining washer.

In testimony whereof, I have affixed my signature hereto.

JOSEPH A. GANSTER.